United States Patent
Shoji (10) Patent No.: US 11,159,184 B2
(45) Date of Patent: Oct. 26, 2021

(54) SOFTWARE-DEFINED RADIO DEVICE AND METHOD OF USING RADIO COMMUNICATION SOFTWARE PROGRAMS

(71) Applicant: Hitachi Kokusai Electric Inc., Tokyo (JP)

(72) Inventor: Tomoya Shoji, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 123 days.

(21) Appl. No.: 16/488,954

(22) PCT Filed: Feb. 19, 2018

(86) PCT No.: PCT/JP2018/005721
§ 371 (c)(1),
(2) Date: Aug. 27, 2019

(87) PCT Pub. No.: WO2018/168343
PCT Pub. Date: Sep. 20, 2018

(65) Prior Publication Data
US 2020/0014409 A1 Jan. 9, 2020

(30) Foreign Application Priority Data

Mar. 16, 2017 (JP) .............................. JP2017-050730

(51) Int. Cl.
G06F 15/177 (2006.01)
H04B 1/00 (2006.01)
G06F 9/445 (2018.01)

(52) U.S. Cl.
CPC ........... *H04B 1/0003* (2013.01); *G06F 9/445* (2013.01)

(58) Field of Classification Search
CPC ..... H04L 51/16; H04L 67/34; H04L 41/5025; G06F 9/451

(Continued)

(56) References Cited

U.S. PATENT DOCUMENTS

2006/0161885 A1* 7/2006 Krishnaswamy ....... G06F 21/10
717/104
2016/0087933 A1* 3/2016 Johnson .................. H04L 67/34
709/245

FOREIGN PATENT DOCUMENTS

JP 2004-355309 A 12/2004
JP 2006-309533 A 11/2006
(Continued)

OTHER PUBLICATIONS

International Search Report of PCT/JP2018/005721 dated Apr. 10, 2018.

*Primary Examiner* — Wing F Chan
*Assistant Examiner* — Andrew Woo
(74) *Attorney, Agent, or Firm* — Mattingly & Malur, PC (57) ABSTRACT

Domain management functionality is implemented internally to a software-defined radio device. A software-defined radio device that includes plural hardware modules 220 to 222 and implements radio device functions by downloading radio communication software programs 203 for controlling the plural hardware modules from outside. The software-defined radio device includes domain management software 202 among environment software programs 215 that are activated when the device is activated. The domain management software generates an interface necessary to use each of the radio communication software programs according to a domain for each of the radio communication software programs and performs activation, setup, and connection with other programs for each of the radio communication software programs.

3 Claims, 6 Drawing Sheets

(58) Field of Classification Search
USPC .......................................................... 709/220
See application file for complete search history.

(56) References Cited

FOREIGN PATENT DOCUMENTS

| | | |
|---|---|---|
| JP | 2007-089121 A | 4/2007 |
| JP | 2007-148844 A | 6/2007 |
| JP | 2011-086140 A | 4/2011 |
| JP | 2011-134095 A | 7/2011 |

* cited by examiner

| No. | SOFTWARE NAME | DOMAIN PATH |
|---|---|---|
| 1 | ComSoftWare1 | DOMAIN A |
| 2 | ComSoftWare2 | DOMAIN B |

FIG. 6

| No. | DOMAIN PATH | ADDRESS OF DOMAIN MANAGEMENT SOFTWARE CORBA OBJECT |
|---|---|---|
| 1 | DOMAIN A | 0x00000001 |
| 2 | DOMAIN B | 0x00000002 |

FIG. 5

SOFTWARE-DEFINED RADIO DEVICE AND METHOD OF USING RADIO COMMUNICATION SOFTWARE PROGRAMS

TECHNICAL FIELD

The present invention relates to a software-defined radio device and a method of using radio communication software programs.

BACKGROUND ART

As information systems have expanded and become complicated in recent years, in order to minimize system development cost and facilitate maintenance after putting a system into operation, the following are hoped for:

partitioning of system functionality and distributed deployment of functional partitions, decomposing the functionality into components and reusing them, adopting standardized technologies, and realizing interoperability, among others.

For these purposes, distributed object technology is adopted; for example, CORBA (Common Object Request Broker Architecture) is widely used as a standardized technology of distributed object technology. CORBA is the standardized technology that provides a software bus for clients to access objects on a server in a distributed environment and its specifications were standardized by an organization for standardization, OMG (Object Management Group). In CORBA, an interface is defined by using an IDL (Interface Definition Language) which is independent of an OS (Operating System) and it is enabled to execute software functions of other modules by calling a method represented by this interface. A physical connection is made through a connection medium compatible with IP (Internet Protocol)/IIOP (Internet Inter-ORB Protocol) communication.

Meanwhile, software-defined radio devices are those that can be made compatible with plural radio protocols by changing a program running them by a software program, with their hardware resources remaining the same. Software defined radio devices are adapted to reconfigure modules within them by downloading files that define desired functions via a network to implement plural radio protocols. As for software-defined radio devices, some of them that implement radio device functions by combining plural software programs as parts (components) using distributed object technology have also been developed.

Radio device functions are implemented by downloading software programs that implement functions meeting modulation and demodulation schemes, frequency, etc. and their usage. Use of distributed object technology like CORBA enables interconnection among the respective units of modem which performs modulation and demodulation, security, communication method (protocol), control, etc., even when their software programs are deployed, distributed across the system, and enables implementation of a software-defined radio device system as a whole.

In Patent Literature 1, a software communication system is disclosed can manage and expand service types and areas efficiently. In particular, over domain managers which manage domains associated with service types or areas, a super manager that performs centralized administration of the domains is set up, and the super manager allows for expansion and shrinkage of the size of resources managed by the domain managers.

CITATION LIST

Patent Literature

PTL 1: Japanese Patent Application Laid-Open No. 2007-89121

SUMMARY OF INVENTION

Technical Problem

Radio communication software programs of software-defined radio devices are managed by a category called domain. Diverse categories of domains may be used, including service, as in PTL 1, manufacturer, and purpose of operation among others. Usually, interfaces that are necessary for radio communication software programs to pass on information to an operator or the like differ per domain and software-defined radio device also implement radio device functions within a range of radio communication software programs managed under the same domain.

PTL 1 intends to use resources beyond the bounds of domains, can implement radio communication software programs belonging to different domains in a software-defined radio device, and moreover, enables changing a range of resources managed on a per-domain basis by the super manager. From a perspective of software-defined radio devices, however, it is unchanged as before that they use radio communication software programs and resources absolutely defined under one domain.

However, there may be a situation where it is desirable that a software-defined radio device itself is allowed to use radio communication software programs under plural domains. It is a situation where a supervisor for centralized administration of software-defined radio devices does not exist and each individual software-defined radio device wants to use radio communication software programs under different domains according to radio conditions. In this situation, it is required to provide a software-defined radio device with a domain management function internal thereto without setting up a super manager for centralized administration of domains, as in PTL 1.

Furthermore, to make it effective that a software-defined radio device performs domain management, the device must have capability of management of plural domains and, on the other hand, it is required to prevent the performance of the software-defined radio device from deterioration caused by consumption of the power and memory of the software-defined radio device due to the implementation of this function within the software-defined radio device.

Solution to Problem

A software-defined radio device that includes plural hardware modules and implements radio device functions by downloading, from outside, radio communication software programs for controlling the hardware modules. The software-defined radio device includes domain management software among environment software programs that are activated when the device is activated. The domain management software generates an interface necessary to use each of the radio communication software programs according to a domain for each of the radio communication software programs and performs activation, setup, and connection with other programs for each of the radio communication software programs.

Furthermore, the domain management software is integrated domain management software that implements domain management functions which are executed by the domain management software for each of plural domains, and the integrated domain management software implements the domain management functions as threads.

Advantageous Effects of Invention

It is enabled to implement domain management functionality internally to a software-defined radio device. Additionally, availability of radio systems is improved by enabling use of radio communication software programs belonging to plural domains, minimizing deterioration of performance of software-defined radio devices and radio device battery drainage.

DESCRIPTION OF EMBODIMENTS

An embodiment of the invention is now described in detail.

Figure 1:
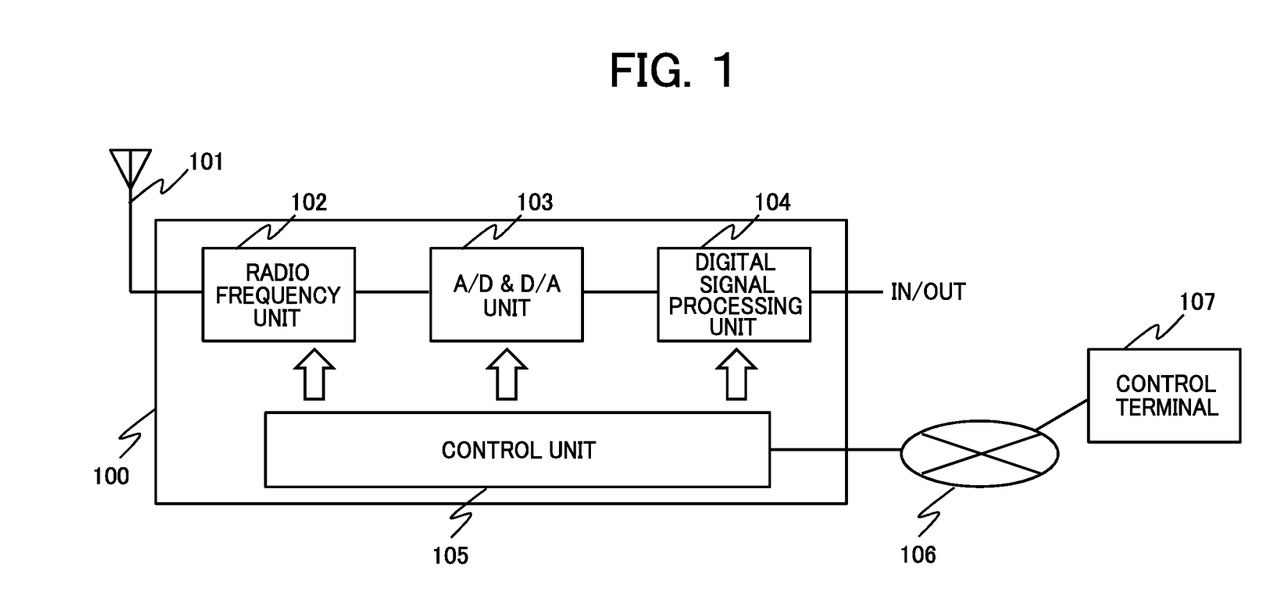
FIG. 1 is a diagram to explain a software-defined radio device.

Software radio technology is a radio communication technology that enables switching between radio communication protocols by changing control software without modifying hardware itself. FIG. 1 depicts an overview of a software-defined radio device 100. The software-defined radio device 100 includes, as hardware modules, an antenna 101, a radio frequency unit 102, an A/D and D/A unit 103, a digital signal processing unit 104, and a control unit 105. The antenna 101 performs radio frequency signal transmission and reception. The radio frequency unit 102 converts a received signal in a radio frequency band received by the antenna 101 to a received signal in a low frequency band or converts a transmission signal in a low frequency band to a transmission signal in a radio frequency band. The A/D and D/A unit 103 converts an analog signal received to a digital signal or converts a digital signal to transmit to an analog signal. The digital signal processing unit 104 performs processing such as, inter alia, encoding a transmission signal and decoding a received signal. The control unit 105 receives control from a control terminal 107 via a network 106 and performs control of the hardware modules of the software-defined radio device.

Figure 2:
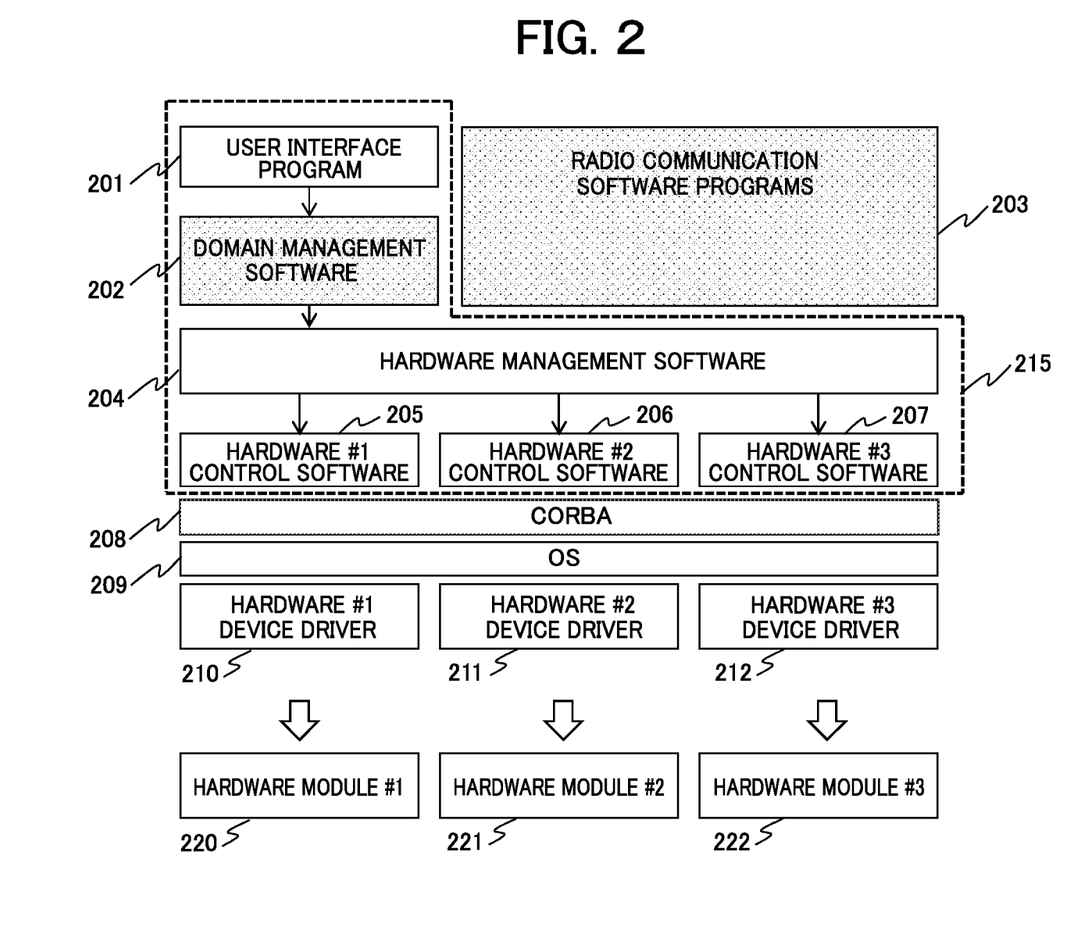
FIG. 2 is a diagram depicting a software configuration of the software-defined radio device.

FIG. 2 depicts a software configuration of the software-defined radio device 100. Hardware modules 220 to 222 correspond to the radio frequency unit 102, A/D and D/A unit 103, and digital signal processing unit 104 in FIG. 1, respectively. Hardware device drivers 210 to 212 drive these hardware modules 220 to 222, respectively. Although they operate on a predefined OS (Operating System) 209, applications and OS/hardware are made separable by CORBA middleware 208. When the software-defined radio device is powered on, the OS 209, hardware device drivers 210 to 212, and CORBA middleware 208 are first activated. Then, environment software programs 215 are activated. The environment software programs 215 are those that have to be active at all time for the software-defined radio device to operate, and a user interface program 201, domain management software 202, hardware management software 204, hardware control software pieces 205 to 207 are included therein. The hardware control software pieces 205 to 207 are also provided to correspond to the hardware device drivers 210 to 212 and they are host software for controlling these drivers.

As a feature of the software-defined radio device, radio functions such as filtering, modulation and demodulation, equalization, and a synchronization function are made programmable and, by rewriting software, change can be made to system-specific radio functions such as a modulation scheme, a transmitting and receiving frequency, a bandwidth, and a transmission rate which are radio parameters. Programs that are rewritten to change these parameters are radio communication software programs 203. Therefore, most of them are activated according to an instruction from a user interface program 201, though the radio communication software programs 203 can be activated also when the device is powered on. In addition, radio communication software programs are heretofore pieces of software managed under one domain and, within the same domain, an interface necessary to use the radio communication software programs is common and, therefore, the software-defined radio device does not need to be aware of the domain. In contrast, in the present embodiment, the software-defined radio device is allowed to use radio communication software programs which are managed under different domains. For this reason, domain management software 202 is provided that, according to a domain under which a radio communication software program is managed, generates an interface necessary to use that program, performs activation, setup, and connection with other programs for the radio communication software program, and also receives, inter alia, a notification of abnormality and a request for an operation record from a software program. This enables the software-defined radio device to use radio communication software programs managed under predefined domains, with the radio communication software programs 203 being free from a fixed domain.

The domain management software 202 is implemented as the environment software 215, as noted above, in the present embodiment. To make this configuration effective, it is necessary for the software-defined radio device to have a domain management software function for plural domains which are anticipated to be used and this function has to be active at all time. That is, since the environment software is not arbitrarily activated by a user, the domain management software regarding radio communication software programs that are likely to be activated has to be activated when the device is powered on. Therefore, even though a radio communication software program being actually used at a point of time is the radio communication software program belonging to one domain, considering that the domain management software covering all domains of such programs that are likely to be used must have been started up, memory consumption involved in this operation results in deterioration of performance of the software-defined radio device or battery drainage, and efficiency decreases significantly.

Figure 3:
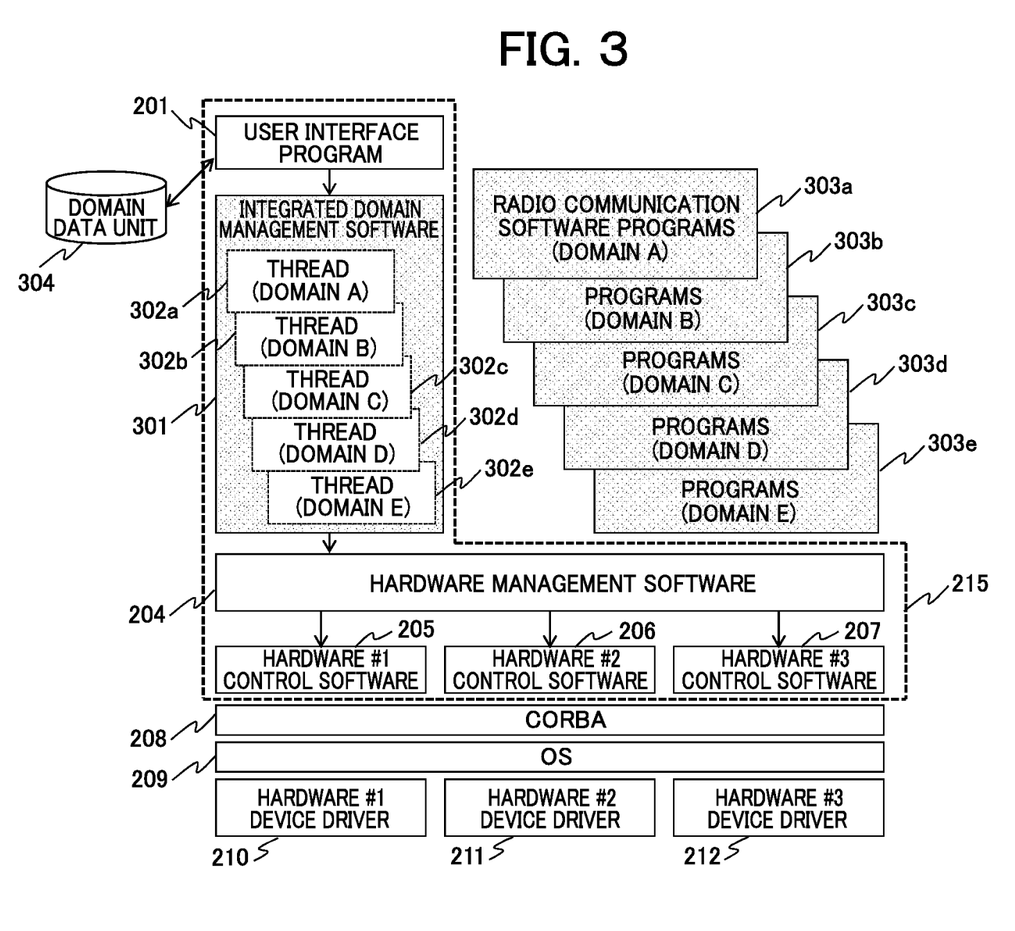
FIG. 3 is a diagram depicting a software structure of the software-defined radio device.
Figure 4:
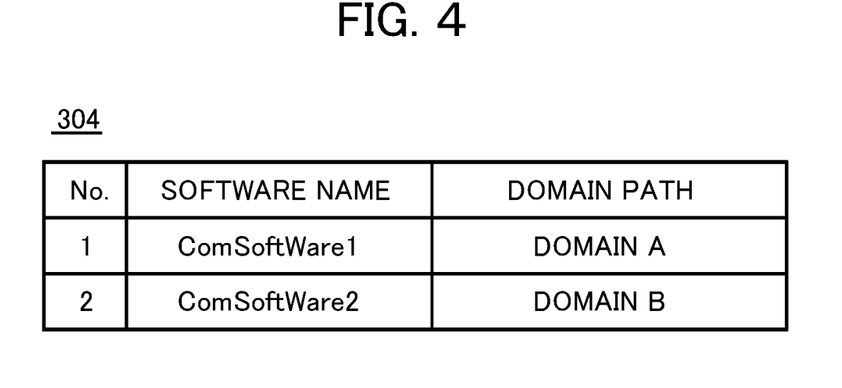
FIG. 4 is a diagram depicting a data structure of records in a domain data unit.

FIG. 3 depicts a software structure that enables execution of radio communication software programs under plural domains, while maintaining the performance of the software-defined radio device. FIG. 4 depicts a data structure of records in a domain data unit 304. The domain data unit 304 is for recording the software name of a radio communication software program and a domain path in which the software is located. A domain path denotes a domain under which the radio communication software program is managed. Thereby, the user interface program 201 can become aware of a domain under which a radio software program is managed by searching through the domain data unit 304.

An integrated domain management software 301 implements the function of the domain management software 202 described in FIG. 2 as threads. By the implementation with threads in this way, only a process (parent thread) of the integrated domain management software will be active at all time and domain management software threads which are implemented as its child threads will be generated as required and deleted when no longer necessary; thereby, performance deterioration or battery drainage can be avoided.

Figure 5:
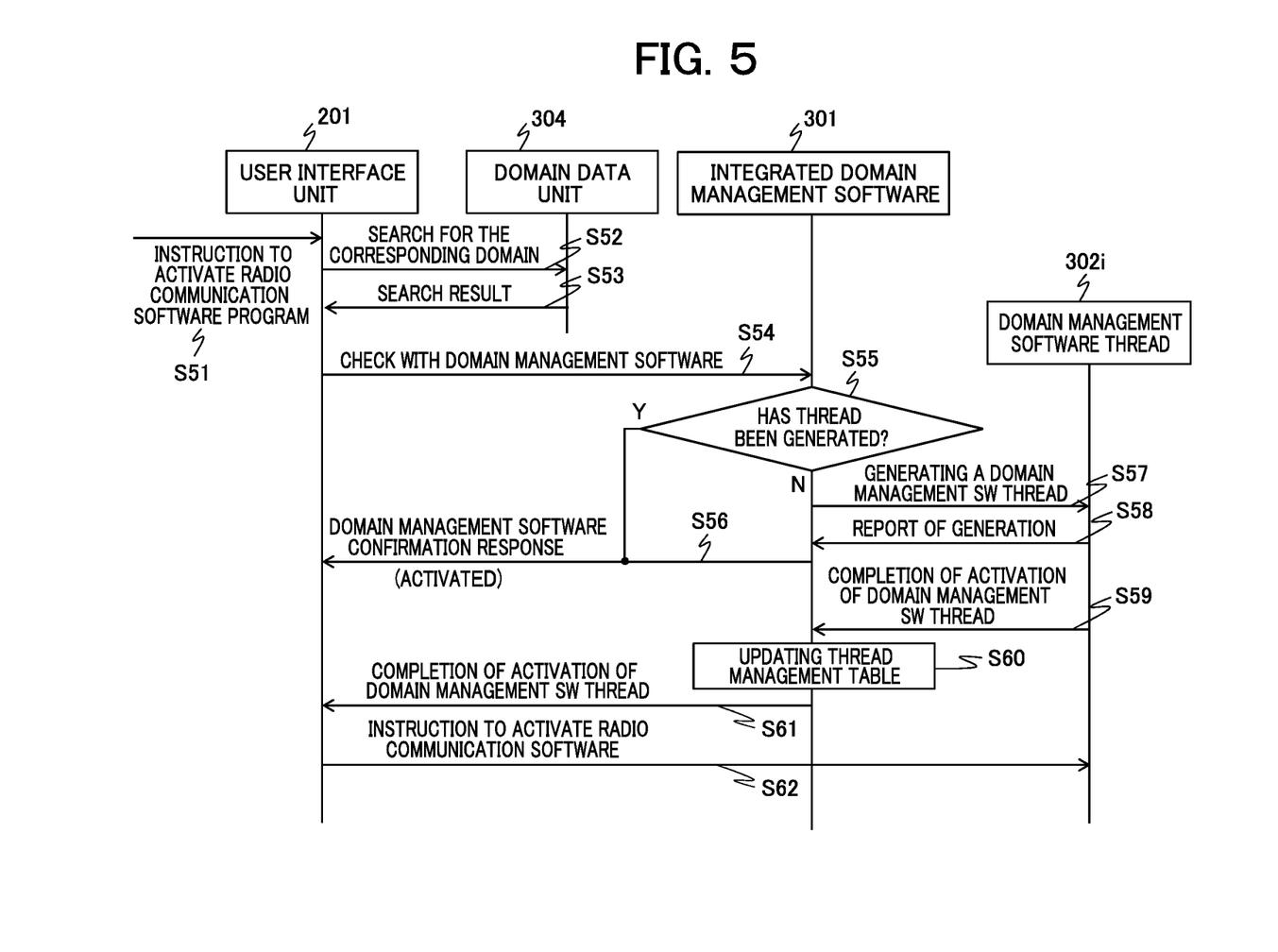
FIG. 5 is a sequence of generating a domain management software thread.
Figure 6:
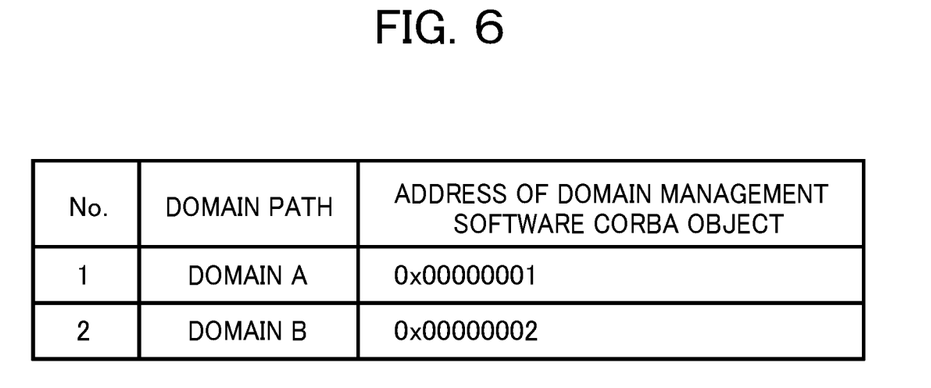
FIG. 6 is a diagram depicting a data structure of a thread management table.

A sequence of generating a domain management software thread 302i is described using FIG. 5. When a user interface unit 201 is instructed of a radio communication software program to be activated from a user (S51), it sends a search instruction to the domain data unit 304 (S52) to become aware of a domain under which the radio communication software program is managed. Upon receiving a search result from the domain data unit 304 (S53), the user interface unit 201 checks with the integrated domain management software 301 as to whether the corresponding domain management software thread has been generated (S54). This inquiry may be made through either a CORBA interface specified in IDL or a message interface using inter-process communication. The integrated domain management software 301 checks to see whether the thread has already been generated using a thread management table which is presented in FIG. 6 (S55). In the thread management table, a memory address is stored where a CORBA servant object that executes a domain management software thread for the corresponding domain is stored, for example, as presented in FIG. 6. If such address is registered, it can be determined that the thread has been generated; if not, the thread has not yet been generated. If the thread has been generated, a response telling that the domain management software thread has been generated is sent to the user interface unit 201 (S56). If the domain management software thread has not yet been generated, the integrated domain management software 301 generates the corresponding domain management software thread (S57), receives a report of generation (S58), and sends a response telling that the domain management software thread has been generated to the user interface unit 201 (S56). Upon completing activation, a newly generated CORBA servant notifies the integrated domain management software 301 of completion of the activation (S59). At this stage, the integrated domain management software 301 updates the thread management table (FIG. 6) and notifies the user interface unit that activation of the domain management software thread (CORBA servant) has been completed. After that, the user interface unit 201 calls a CORBA servant interface to send an instruction to activate the radio communication software program (S62).

Figure 7:
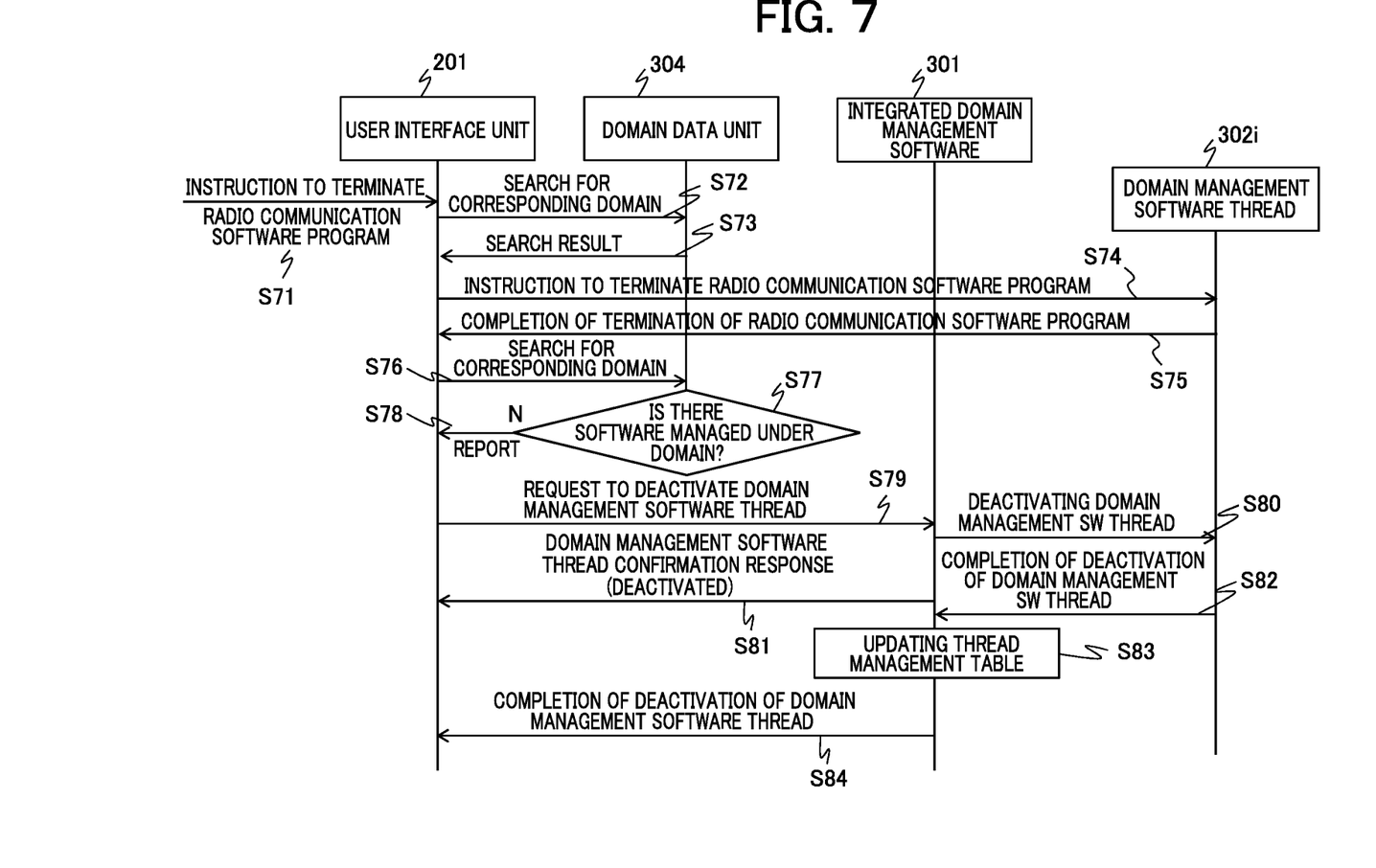
FIG. 7 is a sequence of deleting a domain management software thread.

A sequence of deleting a domain management software thread 302i is described using FIG. 7. When the user interface unit 201 is instructed of a radio communication software program to be terminated from a user (S71), it sends a search instruction to the domain data unit 304 (S72) to become aware of a domain under which the radio communication software program is managed. Upon receiving a search result from the domain data unit 304 (S73), the user interface unit 201 calls the corresponding CORBA servant interface and sends an instruction to terminate the radio communication software program (S74). Upon completing termination of the radio communication software program, the domain management software thread 302i instructed of the termination notifies the user interface unit 201 of completion of the termination (S75). With respect to radio communication software programs that are active currently, the user interface unit 201 checks to see whether there is another radio communication software program that is active currently under the same domain that the terminated program belongs to (S76). If there is another radio communication software program that is active, the processing terminates here. Otherwise, if there is not another radio communication software program that is active under that domain, unnecessary battery use can be avoided and unnecessary memory can be released by deactivating the domain management software thread. Then, the user interface unit 201 issues a request to deactivate the domain management software thread for that domain to the integrated domain management software 301 (S79). Upon receiving this request, the integrated domain management software 301 deactivates the corresponding thread of domain management software (S80) and sends a confirmation response that the domain management software thread is being deactivated to the user interface unit 201 (S81). Upon completion of deactivating the domain management software thread (S82), the integrated domain management software 301 updates the thread management table (FIG. 6) (S83, deletes the address of the CORBA servant object) and notifies the user interface unit 201 that deactivation of the domain management software thread has been completed.

INDUSTRIAL APPLICABILITY

The present invention is applicable to software-defined radio devices and suited for domain management internal to a software-defined radio device. Moreover, the present invention is suited for radio systems that can use radio communication software programs belonging to plural domains, minimizing deterioration of performance of software-defined radio devices and radio device battery drainage. This application claims the benefit of priority on the basis of Japanese Patent Application No. 2017-050730 filed on Mar. 16, 2017, the disclosure of which is incorporated by citation herein in its entirety.

REFERENCE SIGNS LIST

100: software-defined radio device,
101: antenna,
102: radio frequency unit,
103: A/D and D/A unit
104: digital signal processing unit,
105: control unit,
106: network,
107: control terminal

The invention claimed is:
1. A method of using radio communication software programs in a software-defined radio device, the method comprising:
receiving an instruction to activate a first radio communication software program from a user interface unit;

determining whether a thread has been generated, the thread implementing a domain management function for a domain of the first radio communication software program; and generating a new thread for the domain of the first radio communication software program, if such thread has not been generated, wherein, upon being notified of completion of activation of the thread for the domain of the first radio communication software program, the user interface unit instructs the thread to activate the first radio communication software program;

receiving an instruction to terminate a second radio communication software program from the user interface unit; and instructing a thread for a domain of the second radio communication software program to terminate the second radio communication software program, wherein, after completion of termination of the second radio communication software program, the user interface unit determines whether a radio communication software program is active and managed under the same domain that the second radio communication software program belongs to, and wherein, if there is no radio communication software that is active and managed under the same domain that the second radio communication software program belongs to, the thread for the domain of the second radio communication software program is deactivated.

2. The method of using radio communication software programs according to claim 1, wherein the domain management functions include functions of generating an interface necessary to use each of the radio communication software programs according to a domain for each of the radio communication software programs and performing activation, setup, and connection with other programs for each of the radio communication software programs.

3. The method of using radio communication software programs according to claim 1, wherein the domain management functions include functions of generating an interface necessary to use each of the radio communication software programs according to a domain for each of the radio communication software programs and performing activation, setup, and connection with other programs for each of the radio communication software programs.

* * * * *